United States Patent
Chanler et al.

(10) Patent No.: US 10,990,530 B1
(45) Date of Patent: Apr. 27, 2021

(54) IMPLEMENTATION OF GLOBAL COUNTERS USING LOCALLY CACHED COUNTERS AND DELTA VALUES

(71) Applicant: EMC IP Holding Company LLC, Hopkinton, MA (US)

(72) Inventors: Andrew L. Chanler, Berlin, MA (US); John Creed, Inishannon (IE); Kaustubh S. Sahasrabudhe, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/665,379

(22) Filed: Oct. 28, 2019

(51) Int. Cl.
*G06F 12/0842* (2016.01)

(52) U.S. Cl.
CPC .. *G06F 12/0842* (2013.01); *G06F 2212/1016* (2013.01); *G06F 2212/608* (2013.01)

(58) Field of Classification Search
None
See application file for complete search history.

(56) References Cited

U.S. PATENT DOCUMENTS

| 2010/0228927 A1* | 9/2010 | Levanoni | G06F 9/467 711/154 |
| 2014/0223119 A1* | 8/2014 | McKenney | G06F 11/3419 711/162 |
| 2017/0339243 A1* | 11/2017 | Balafoutis | H04L 67/1002 |

OTHER PUBLICATIONS

Wikipedia, "Read-copy-update," https://en.wikipedia.org/wiki/Read-copy-update, Sep. 24, 2019.

* cited by examiner

*Primary Examiner* — Sean D Rossiter
*Assistant Examiner* — Stephanie Wu
(74) *Attorney, Agent, or Firm* — Muirhead and Saturnelli, LLC

(57) ABSTRACT

Providing global values may include configuring a global memory to include a global counter and configuring processing cores to have private caches each including two sets of buffers, an update toggle and a read toggle. A processing core having a first private cache may perform processing to read a current value for the global counter including determining the current value of the global counter as a mathematical sum of a local counter value and a local delta value from one of the two sets of buffers of the first private cache identified by the read toggle. The processing core may perform processing to modify the global counter by a first amount by updating the local delta value from a specified one of the two set of buffers of the first private cache identified by the update toggle.

19 Claims, 7 Drawing Sheets

US 10,990,530 B1

IMPLEMENTATION OF GLOBAL COUNTERS USING LOCALLY CACHED COUNTERS AND DELTA VALUES

BACKGROUND

Technical Field

This application generally relates to implementation of global data items or data values.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may host applications that utilize the data services provided by one or more storage systems of the storage network to store data on the physical storage devices (e.g., tape, disks or solid state devices) thereof. For a given application, to perform I/O operations utilizing a physical storage device of the storage system, one or more components of the host system, storage system and network components therebetween may be used. Each of the one or more combinations of these components over which I/O operations between an application and a physical storage device can be performed may be considered an I/O path between the application and the physical storage device. These I/O paths collectively define a connectivity of the storage network.

SUMMARY OF THE INVENTION

Various embodiments of the techniques herein may include a method, a system and a computer readable medium for providing global values comprising: configuring a global memory to include a global counter; configuring a plurality of processing cores to have a plurality of private caches, wherein each private cache of the plurality of private caches is used exclusively by a different one of the plurality of processing cores, where said each private cache includes two sets of buffers, an update toggle and a read toggle, wherein each of the two sets of buffers in each of the plurality of private caches includes a local counter and a local delta value corresponding to the global counter; performing first processing by a first of the plurality of processing cores to read a current value for the global counter, wherein a first private cache of the plurality of private caches is used exclusively by the first processing core, wherein the first processing comprises: determining the current value of the global counter as a mathematical sum of the local counter value and the local delta value from one of the two sets of buffers of the first private cache identified by the read toggle of the first private cache; and performing second processing by the first processing core to modify the global counter by a first amount, wherein the second processing comprises: updating the local delta value from a specified one of the two set of buffers of the first private cache identified by the read toggle, wherein said updating includes adding the first amount to the local delta value from the specified one of the two set of buffers of the first private cache identified by the update toggle of the first private cache.

In at least one embodiment, initialization processing may be performed prior to performing the first processing and prior to performing the second processing. The initialization processing may include: copying a current value of the global counter from the global memory to the local counter of a first set of the two sets of buffers in each of the plurality of private caches; initializing the update toggle of each of the plurality of private caches to identify the first set of buffers of said each private cache; and initializing the read toggle of each of the plurality of private caches to identify the first set of buffers of said each private cache.

In at least one embodiment, the global memory may be configured to include one or more global counters including the global counter. Each of two sets of buffers in each of the plurality of private caches may include one or more local counters corresponding to the one or more global counters and may also include one or more local delta values corresponding to the one or more global counters.

In at least one embodiment, processing may include periodically performing third processing by the first processing core to update the one or more global counters of the global memory. The third processing may include: acquiring an exclusive lock on the one or more global counters of the global memory; copying the one or more global counters of the global memory to the one or more local counters of a first of the two sets of buffers of the first private cache of the first processing core; modifying the update toggle of the first private cache to identify the first set of buffers of the first private cache of the first processing core; adding the one or more local delta values from the second set of buffers of the first private cache to the one or more local counters of the first set of buffers of the first private cache; updating the one or more global counters of the global memory to have one or more revised values equal to the one or more local counters of the first set of buffers of the first private cache; releasing the exclusive lock on the global counter of the global memory; modifying the read toggle to identify the first set of buffers of the first private cache of the first processing core; and clearing the one or more local delta values of the second set of buffers of the first private cache.

In at least one embodiment, the global memory may be a distributed global memory including a plurality of memory global memory segments from a plurality of computing modules. Each of the plurality of computing modules may include a different portion of the plurality of processing cores and a corresponding portion of the plurality of private caches used by the plurality of processing cores. Each of the plurality of private caches, that is included in a first of the plurality of computing modules, may be configured from a segment of memory used exclusively by a first portion of the plurality of processing cores of said first computing module. Each of the plurality of processing cores includes a plurality of central processing units (CPUs).

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

Figure 1:
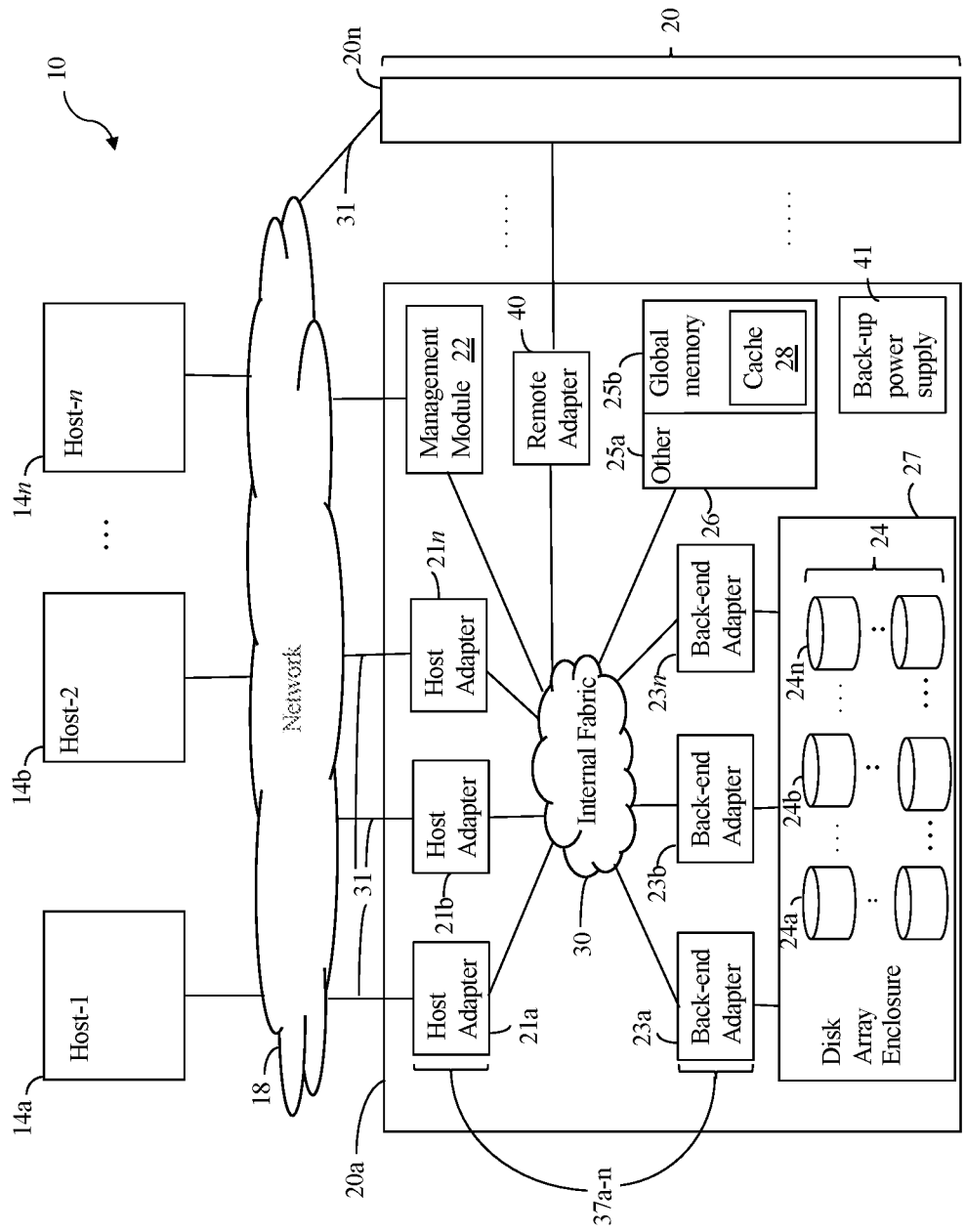
FIG. 1 is a block diagram illustrating an example of a data storage network in an embodiment in accordance with the techniques herein.

A storage system may have a plurality of physically discrete computing modules (hereinafter "computing modules") interconnected by an internal switching fabric of the storage system. For example, a computing module may be a director board of a PowerMax™ system made available from Dell EMC. Each computing module may have its own dedicated local memory and a global memory (GM) segment that is a portion of a distributed GM shared by multiple (e.g., all) computing modules. Each computing module may include one or more central processing units (CPUs), and, within each computing module, groups of two or more CPUs may be grouped into processing units referred to herein as processing cores. Each of these processing cores may be configured (e.g., hardwired, hardcoded or programmed) as a functional component of a storage system, for example, a front-end adapter (FA) or back-end adapter (BE) as described in more detail herein, or as some other functional component, for example, a data services component (DS) responsible for one or more data services, e.g., memory management for I/O operations. In some embodiments, a processing core may be configured to serve as a different functional component for different I/O operations.

In some applications, a global value or data item may be shared among multiple processing cores. In one existing system, the global data item may be stored in a memory location that is accessible by each of the processing cores. Whenever an update is made to the global data item by one processing core, a lock or other synchronization mechanism may be used to provide exclusive access of the global data item to updating processing core. In such a case, all other processing cores that need to access the global data item for reading or writing may have to wait until the update is complete and the lock has been released by the one processing core performing the update.

Described in following paragraphs are techniques that may be used in connection with a global data item that is shared for use by multiple entities. The global data item may be accessed for read and/or write by any of the multiple entities. The global data item may be a counter, or more generally, any suitable value shared among the multiple entities, such as processing cores or directors. Each such entity, such as a processing core, may have information stored in its local cache, or more generally, local memory. In at least one embodiment, the local memory used by a processing core may be further characterized as a portion of memory that is private and used exclusively by the processing core and not by any other processing core. The global value, such as a global counter having a value shared among multiple processing cores, may be implemented using a GM as well as the local memories of the processing cores. In at least one embodiment, the GM may store the global counter value. The GM may be a distributed GM including memory portions or partitions distributed across multiple boards, or more generally, computing modules. The distributed GM may include a GM logical address space that is mapped to the different memory portions or partitions physically located on different boards or computing modules.

In at least one embodiment, a double buffering technique may be utilized in which two sets of buffers are included in each processing core's local cache or memory. In at least one embodiment, the double buffering technique uses 2 sets or buffers of the counters and 2 sets or buffers of delta values, and alternates between using each of the 2 sets or buffers of the counters and delta values. Toggle values may be used to denote which particular set of buffers or counters are used at a point in time, for example, in connection with reading or updating a counter at a local level by a single processing core. The techniques described herein use the double buffering in connection with reading cached values and pushing locally cached updated values back to the copy of the counters stored in the GM. Each processing core may read the counter by accessing the counter value and delta value stored in the processing core's local memory. In at least one embodiment where each processing core has its own locally cached copy of the counter and delta value and the local cache of the processing core is used exclusively by the processing core, reading a counter by a processing core may not block other reads performed with respect to the counter. Furthermore, modifying or updating a counter by a processing core may be performed by updating a delta value cached locally in the local cache of the processing core. In at least one embodiment, modifying or updating the counter by a processing core may not block read operations performed with respect to the counter.

In at least one embodiment, a process may be executed periodically by each processing core to copy the processing core's locally updated cached counters to the copy of the counters stored in the GM. In at least one embodiment, multiple counters or values may be updated together during the update process. In such an embodiment, for each single counter stored in the GM, each processing core's local cache may be configured to store 2 sets or pairs of counters corresponding to single GM counter. In at least one embodiment in which there are multiple GM counters, the multiple GM counters may be updated together atomically.

In at least one embodiment where there are multiple counters, the GM counters may be implemented as an array of counters. In a similar manner in such an embodiment, each processing core may have a local cache or memory configured to implement a first set of counters as an array of counters, a first set of delta values as an array of delta values, a second set of counters as an array of counters, and a second set of delta values as an array of delta values.

The foregoing and other aspects of the techniques herein are described in more detail in following paragraphs.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. The storage systems 20a-n, connected to the host systems 14a-n through the network 18, may collectively constitute a distributed storage system 20. All of the host computers 14a-n and the storage systems 20a-n may be located at the same physical site, or, alternatively, two or more host computers 14a-n and/or storage systems 20a-n may be located at different physical locations. The storage network 10 or portions thereof (e.g., one or more storage systems 20a-n in combination with network 18) may be any of a variety of types of storage networks, such as, for example, a storage area network (SAN), e.g., of a data center. Embodiments of the techniques described herein are in reference to the storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (I/O) operations or data requests, through the network 18. For example, each of the hosts 14a-n may include one or more host bus adapters (HBAs) (not shown) that each include one or more host ports for connecting to the network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMe-of); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of the network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of I/O operations in accordance with different tasks and applications executing on the hosts. In the embodiment of FIG. 1, any one of the host computers 14a-n may issue an I/O request to the storage system 20a to perform an I/O operation. For example, an application executing on one of the host computers 14a-n may perform a read or write operation resulting in one or more I/O requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all I/O communications with one or more physical storage devices 24 may be controlled by a specific BE. The BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs).

Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for I/O communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

The storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to the storage system 20a via the network 18.

The FAs, BEs and RA may be collectively referred to herein as directors 37a-n. Each director 37a-n may include a processing core including compute resources, for example, one or more CPUs cores and/or a CPU complex for processing I/O operations, and may be implemented on a circuit board, as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

The system 20a also may include an internal switching fabric (i.e., internal fabric) 30, which may include one or more switches, that enables internal communications between components of the storage system 20a, for example, the directors 37a-n (FAs 21a-n, BEs 23a-n, RA 40, management module 22) and the memory 26, e.g., to perform I/O operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. The GM 25b and the cache 28 are described in more detail elsewhere herein. It should be appreciated that, although the memory 26 is illustrated in FIG. 1 as being a single, discrete component of storage system 20a, the techniques herein are not so limited. In some embodiments, memory 26, or the GM 25b or the other memory 25a thereof, may be distributed among a plurality of circuit boards (i.e., "boards"), as described in more detail elsewhere herein.

In at least one embodiment, write data received at the storage system from a host or other client may be initially written to the cache 28 and marked as write pending (WP). For example, the cache 28 may be partitioned into one or more portions called cache slots, which may be a of a predefined uniform size, for example, 128 Kbytes. Write data of a write operation received at the storage system may be initially written (i.e., staged) in one or more of these cache slots and marked as write pending. Once written to the cache 28, the host (e.g., one of 14a-n) may be notified that the write operation has completed. At a later time, the write data may be de-staged from the cache 28 to one or more physical storage devices 24a-n, such as by a BE.

It should be noted that, although examples of techniques herein may be made with respect to a physical storage system and its physical components (e.g., physical hardware for each RA, BE, FA and the like), the techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

The storage system 20a may include a back-up power supply 41 (e.g., a battery) that can provide power to the storage system for a limited amount of time to after primary (AC) power fails. This limited time may allow certain tasks to be performed during a window time beginning when the primary power fails until the earliest of: the primary power is restored; and the end of the limited lifetime (sometimes on the order of second or tens of seconds) of the back-up power supply. For example, during this window of time, the contents of the cache 28 may be de-staged to one or more physical storage devices.

Figure 2:
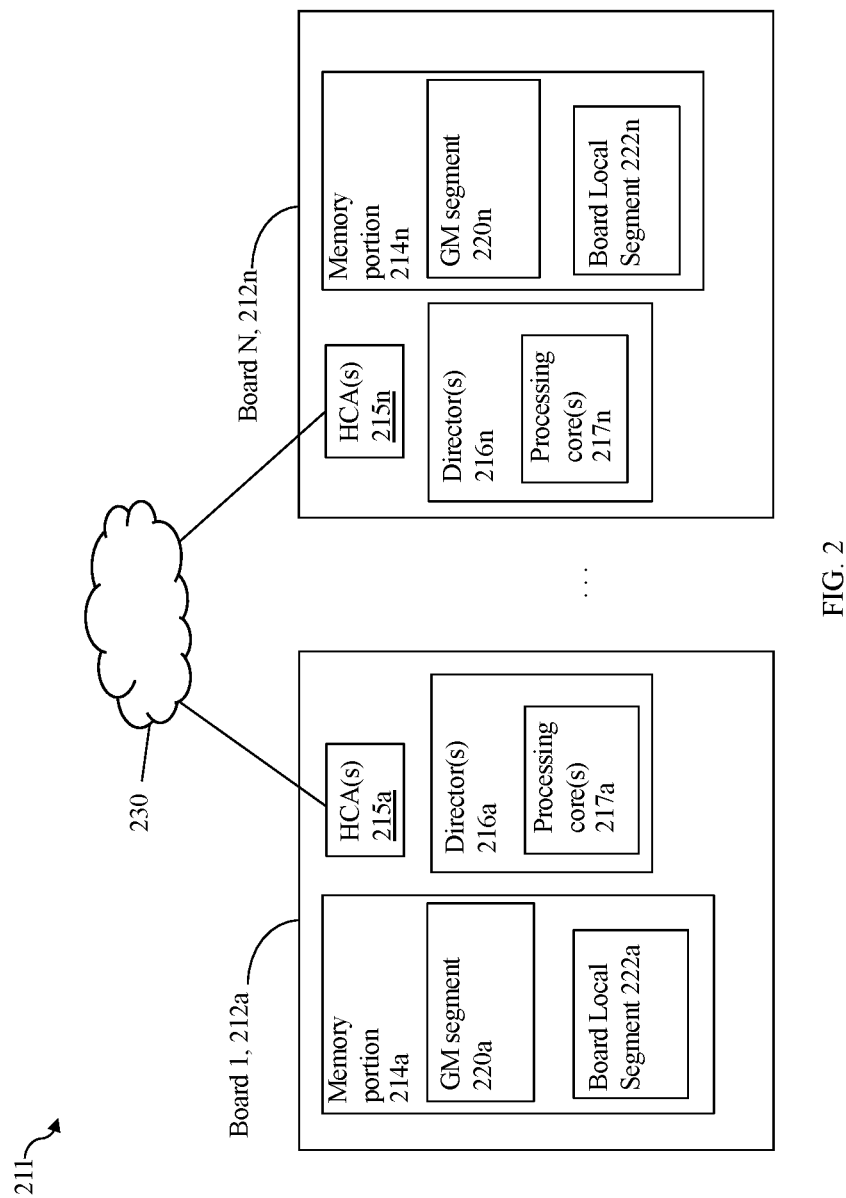
FIG. 2 is a block diagram illustrating an example of a storage system including multiple circuit boards in an embodiment in accordance with the techniques herein.

Any of the storage systems 20a-n, or one or more components thereof, described in relation to FIGS. 1-2 may be implemented using one or more Symmetrix®, VMAX®, VMAX3® or PowerMax™ systems made available from Dell EMC (elsewhere referred to herein collectively as PowerMax Systems).

The host systems 14a-n may provide data and control (e.g., management and access control) information to the storage systems 20a-n over a plurality of I/O paths defined between the host systems and the storage systems, for example, including host system components, storage system components, and network components (e.g., of network 18), and the storage systems also may provide data to the host systems across the I/O paths. In the embodiment of FIG. 1, the host systems may not address the physical storage devices (e.g., disk drives or flash drives) 24 of the storage systems directly. Rather access to data may be provided to one or more host systems from what the host systems view as a plurality of logical storage units (LSUs) including, for example, a logical volume, logical block, LUN (i.e., logical device or logical disk), thin device, groups of logical devices (e.g., storage group), NVMe namespace, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple boards 212a-212n. The storage system 211 may include a plurality of boards 212a-212n and a fabric 230 (e.g., internal fabric 30) over which the boards 212a-n may communicate. Each of the boards 212a-212n may include components thereon as illustrated. The fabric 230 may include, for example, one or more switches and connections between the switch(es) and boards 212a-212n. In at least one embodiment, the fabric 230 may be an IB fabric.

In the following paragraphs, further details are described with reference to board 212a but each of the N boards in a system may be similarly configured. For example, the board 212a may include one or more directors 216a (e.g., directors 37a-n) and memory portion 214a. The one or more directors 216a may include one or more processing cores 217a including compute resources, for example, one or more CPUs cores and/or a CPU complex for processing I/O operations, and be configured to function as one of the directors 37a-n described herein. For example, element 216a of board 212a may be configured to operate, such as by executing code, as any one or more of an FA, BE, RA, and the like.

Each of the boards 212a-n may include one or more host channel adapters (HCAs) 215a-n, respectively, that physically couple, and are configured to enable communication between, the boards 212a-n, respectively, and the fabric 230. In some embodiments, the fabric 230 may include multiple (e.g., 2) switches, and each HCA 215a-n may have multiple (e.g., 2) ports, each one connected directly to one of the switches.

Each of the boards 212a-n may, respectively, also include memory portions 214a-n. The memory portion of each board may be characterized as locally accessible with respect to that particular board and with respect to other components on the same board. For example, the board 212a includes the memory portion 214a which is memory that is local to that particular the board 212a. Data stored in the memory portion 214a may be directly accessed by a CPU or core of a director 216a of the board 212a. For example, the memory portion 214a may be a fast memory (e.g., DIMM (dual inline memory module) DRAM (dynamic random access memory)) that is locally accessible by a director 216a where data from one location in 214a may be copied to another location in 214a directly using DMA operations (e.g., local memory copy operations) issued by the director 216a. Thus, the director 216a may directly access data of 214a locally without communicating over the fabric 230.

The memory portions 214a-214n of the boards 212a-n may be further partitioned into different portions or segments for different uses. For example, each of the memory portions 214a-214n may respectively include the GM segments 220a-n configured for collective use as segments of a distributed GM. Thus, data stored in any GM segment 220a-n may be accessed by any director 216a-n on any board 212a-n. Additionally, each of the memory portions 214a-n may respectively include the board local segments 222a-n. Each of the board local segments 222a-n are respectively configured for use locally by the one or more directors 216a-n, and possibly other components, residing on the same single board. In at least one embodiment where there is a single director denoted by 216a (and generally by each of 216a-n), data stored in the board local segment 222a may be accessed by the respective single director 216a located on the same board 212a. However, the remaining directors located on other ones of the N boards may not access data stored in the board local segment 222a.

To further illustrate, the GM segment 220a may include information such as user data stored in the data cache, metadata, and the like, that is accessed (e.g., for read and/or write) generally by any director of any of the boards 212a-n. Thus, for example, any director 216a-n of any of the boards 212a-n may communicate over the fabric 230 to access data in GM segment 220a. In a similar manner, any director 216a-n of any of the boards 212a-n may generally communicate over fabric 230 to access any GM segment 220a-n comprising the GM. Although a particular GM segment, such as 220a, may be locally accessible to directors on one particular board, such as 212a, any director of any of the boards 212a-n may generally access the GM segment 220a. Additionally, the director 216a may also use the fabric 230 for data transfers to and/or from GM segment 220a even though 220a is locally accessible to director 216a (without having to use the fabric 230).

Also, to further illustrate, the board local segment 222a may be a segment of the memory portion 214a on the board 212a configured for board-local use solely by components on the single/same board 212a. For example, the board local segment 222a may include data which is used and accessed only by the directors 216a included on the same board 212a as the board local segment 222a. In at least one embodiment in accordance with techniques herein, each of the board local segments 222a-n may include a local page table or page directory used, respectively, by only director(s) 216a-n local to each of the boards 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the data cache, various metadata and/or structures, and other information, as described in more detail elsewhere herein. Consistent with discussion herein, the data cache, having cache slots allocated from GM segments 220a-n, may be used to store I/O data (e.g., for servicing read and write operations).

Figure 3:
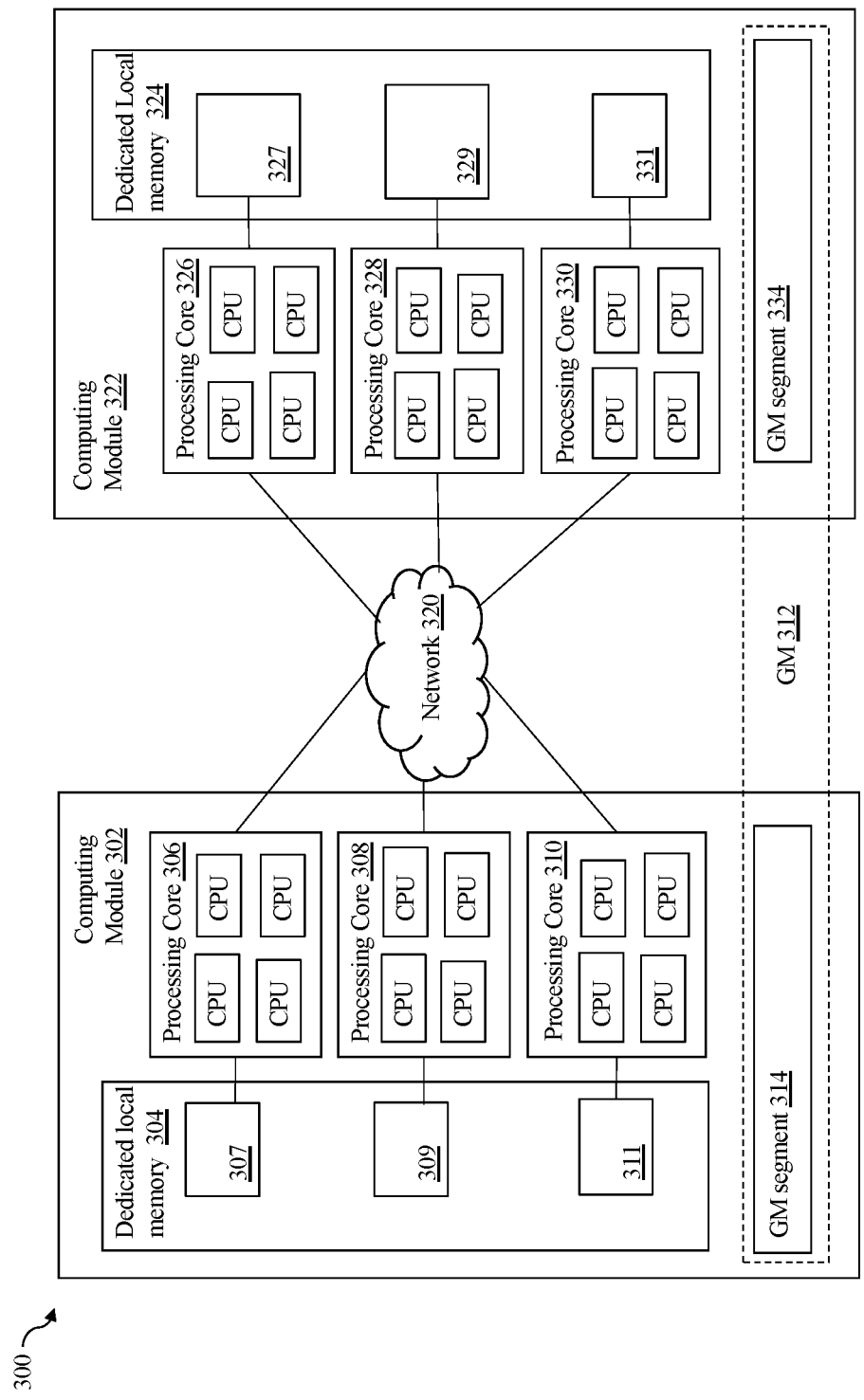
FIG. 3 is a block diagram illustrating an example of a storage system including multiple computing modules and processing cores in an embodiment in accordance with the techniques herein.

FIG. 3 is a block diagram illustrating an example of a storage system 300 including multiple computing modules and processing cores in an embodiment in accordance with the techniques herein. Other embodiments of a storage system including multiple computing modules and processing cores, for example, variations of the storage system 300, are possible and are intended to fall within the scope of embodiments of the techniques herein. The storage system 300 may be a variation of the storage system 211 and may include any of the functionality and/or component described above in relation to storage systems 211 and/or 20a.

The storage system 300 may include multiple computing modules, including computing modules 302 and 322. It should be appreciated that the storage system may include more than two computing modules. Each of computing modules 302 and 322 may be a director board of a PowerMax system made available from Dell EMC. Each of the computing modules 302 and 322 may include generally one or more processing cores. For example, the computing module 302 may include the processing cores 306, 308 and 310; and the computing module 322 may include the processing cores 326, 328 and 330. Each processing core may generally include one or more CPUs. In at least one embodiment, each processing core may generally denote a single processor or CPU. As a variation and as illustrated in the embodiment of FIG. 3, for example, each processing core may include a plurality of CPUs, including a number other than four as illustrated in FIG. 3. Each of the processing cores 306, 308, 310, 326, 328 and 330 may be configured (e.g., hardwired, hardcoded or programmed) as a functional component of a storage system, for example, an FA, BE or DS.

Each of the computing modules 302, 322 may include, respectively, dedicated local memory 304, 324 dedicated to the computing module. Each of the dedicated local memories 304, 324 may be an implementation of a board local segment, such as the board local segment 222a described in relation to the storage system 211 of FIG. 2. Further each of the processing cores 306, 308 and 310 may be allocated a portion of the local memory 304 for exclusive or private use by the single processing core. For example, the memory portions 307, 309 and 311 may be configured for exclusive or private use, respectively, by the processing cores 306, 308 and 310; and the memory portions 327, 329 and 331 may be configured for exclusive or private use, respectively, by the processing cores 326, 328 and 330.

In at least one embodiment in accordance with the techniques herein, some or all of a local memory portion designated for exclusive private use by a single processing core may be used as a local cache by the single processing core. For example, the memory portion 307 may denote a portion of the dedicated local memory 304 designated as a local or private cache of the processing core 306, the memory portion 309 may denote a portion of the dedicated local memory 304 designated as a local or private cache of the processing core 308, and the memory portion 311 may denote a portion of the dedicated local memory 304 designated as a local or private cache of the processing core 310. Additionally, the memory portion 327 may denote a portion of the dedicated local memory 324 designated as a local or private cache of the processing core 326, the memory portion 329 may denote a portion of the dedicated local memory 324 designated as a local or private cache of the processing core 328, and the memory portion 331 may denote a portion of the dedicated local memory 324 designated as a local or private cache of the processing core 330.

The memory portions denoting the processing core local or private caches 307, 309, 311, 327, 329 and 331 may be configured to store values or data items as described in more details in following paragraphs for use with the techniques herein.

The GM segment 314 may be a shared portion of a distributed GM 312. Distributed GM 312 may include a GM segment 334 of a computing module 322. The computing module 322 may be connected to the computing module 302 by an internal fabric 320

In at least one embodiment in which each processing core may include multiple CPUs and multiple processes may be executing simultaneously on the CPUs of the single processing core, processing may be performed to synchronize access to the processing core's local or private resources among the CPUs of the single processing core using such resources. For example, in at least one embodiment as described above and illustrated in the FIG. 3, each processing core may use a local or private cache configured out of the dedicated local memory (e.g., local to a single computing module or board including the processor code). In such an embodiment, any suitable synchronization technique or mechanism may be used to provide exclusive serial access, when needed, to a location or data value in each of the memory portions 307, 309, 311, 327, 329 and 331 used by the multiple CPUs in a single processing core. For example, a synchronization technique may be used to synchronize access to locations of the private cache 307 used by the multiple CPUs of the processing core 306; a synchronization technique may be used to synchronize access to locations of the private cache 309 used by the multiple CPUs of the processing core 308; a synchronization technique may be used to synchronize access to locations of the private cache 311 used by the multiple CPUs of the processing core 310; a synchronization technique may be used to synchronize access to locations of the private cache 327 used by the multiple CPUs of the processing core 326; a synchronization technique may be used to synchronize access to locations of the private cache 329 used by the multiple CPUs of the processing core 328; and a synchronization technique may be used to synchronize access to locations of the private cache 331 used by the multiple CPUs of the processing core 330.

As a variation, each processing core may rather be characterized as a processor or single CPU rather than a core of multiple CPUs. In this case in which the processing core is rather a single CPU, there is no contention for locally used resources among multiple CPUs of the same core. In the embodiment in which the core includes a single CPU, no synchronization technique or mechanism is necessary when accessing, for example, the portions of the private cache of the core denoting a single CPU. For example, if 306 denotes only a single CPU, then no synchronization technique or mechanism is necessary when accessing, for example, the portions of the private cache or memory 307 used exclusively by the single CPU 306.

Figure 4:
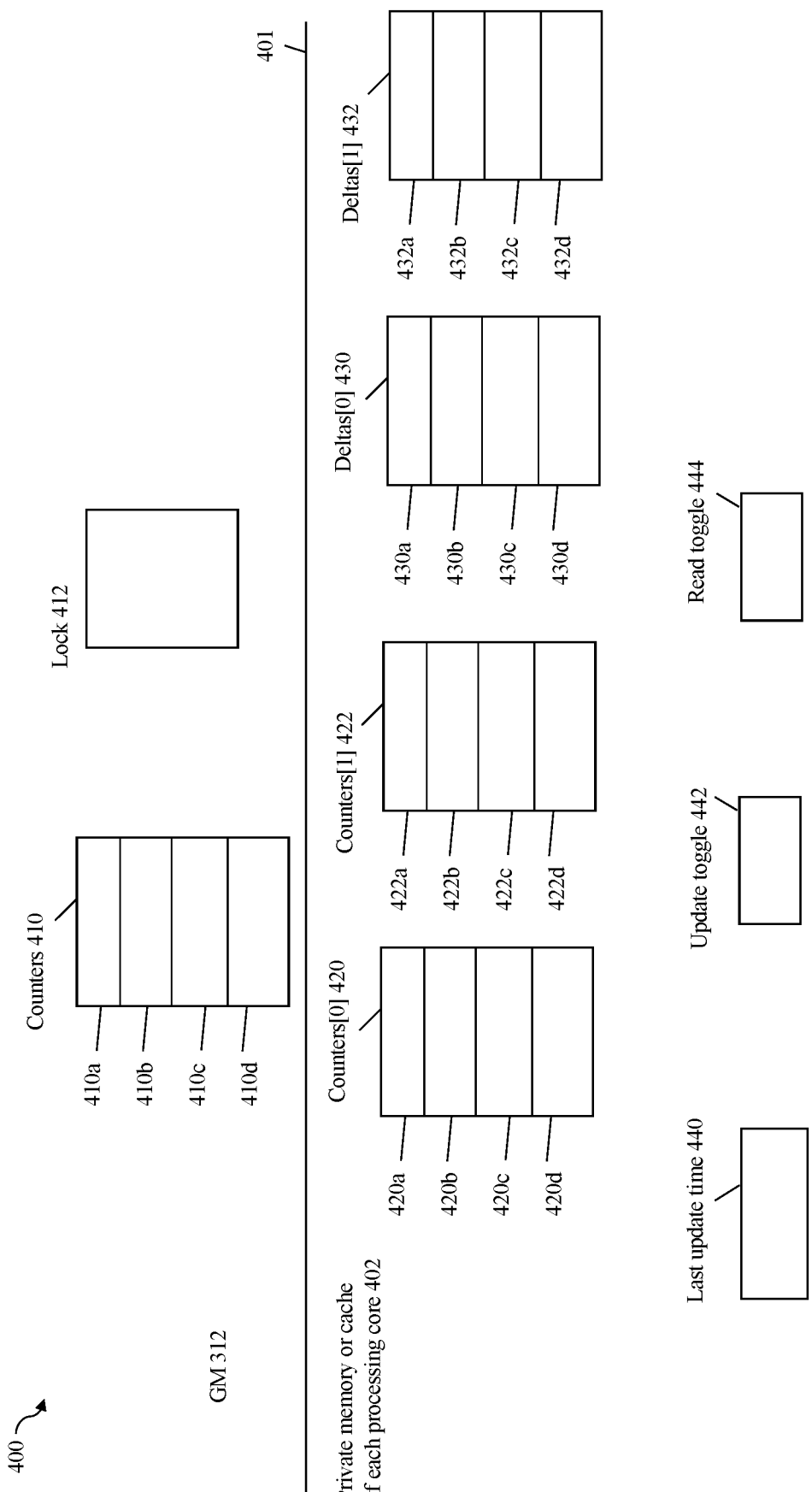
FIG. 4 is an example illustrating data items and structures that may be used in an embodiment in accordance with the techniques herein.

Referring to FIG. 4, shown is an example of data items and structures that may be used in an embodiment in accordance with the techniques herein. The example 400 includes a line 401 where data items and structures above the line 401 are stored in the GM 312 and where data items and structure below the line 401 are stored in each private memory or cache 402 local to each processing core. For example, the values below the line 401 denote an instance or set of the data items and structures stored in each of 307, 309, 311, 327, 329 and 331 of the FIG. 3. Each instance or set of the data structures and items is used locally and exclusively by one of the processing cores.

In the example 400, the GM 312 may include counters 410 and lock 412. The counter 410 denote multiple counters 410a-d. Although FIG. 4 illustrates 4 global counters 410a-d, more generally, the GM 312 may include one or more counters stored in the GM 312 where each such counter of 410 denotes a different global counter value. The lock 412 is an update lock that may be acquired by a processing core in connection with updating one or more of the counters 410. Updating the counters 410 of the GM 312 may require exclusive access to the counters 410. Such synchronization of 410 among multiple processing cores may be performing using the lock 412 where only a single processing core (as a single writer) is able to acquire the lock 412 to serialize write access to the counters 410. In at least one embodiment, all the counters 410a-d may be updated in bulk together. Thus, only a single lock 412 is shown since it is assumed that a processing core acquires the lock 412 to update all the counters 410. As a variation, an embodiment may provide a different number of locks depending on the desired level of granularity of updates performed to the counters 410. For example, a different update lock 412 may be provided for each individual counter of 410 if a processing core may update a single one of the counters 410a-d without updating the remaining ones of the counters 410a-d.

For each global counter of 410 included in the GM 312, each processing core may include 2 corresponding counter values in counters[0] 420 and counters 422[1], and may also include 2 corresponding delta values or deltas in deltas[0] 430 and deltas[1] 432.

Generally, counters[0] 420 denotes a first set of buffers and counters[1] 422 denotes a second set of buffers used in connection with the double buffering technique described herein. In particular, elements 420a and 422a may denote local counter values for a first global counter 410a of the GM 312, and elements 430a and 432a may denote local deltas for use in connection with local updates made to the first global counter 410a. Elements 420b and 422b may denote local counter values for a second global counter 410b of the GM 312, and elements 430b and 432b may denote local deltas for use in connection with local updates made to the second global counter 410b. Elements 420c and 422c may denote local counter values for a third global counter 410c of the GM 312, and elements 430c and 432c may denote local deltas for use in connection with local updates made to the third global counter 410c. Elements 420d and 422d may denote local counter values for a fourth global counter 410d of the GM 312, and elements 430d and 432d may denote local deltas for use in connection with local updates made to the fourth global counter 410d.

The last update time 440 may denote a timestamp of the last or most recent point in time at which the locally update counters of the processing core have been pushed or copied to the GM 312. Each processing core may periodically update or push its locally cached counters to the global values of the counters 410 stored in GM. Such updated may be performed at any time interval or time period suitable for a particular application using the techniques herein. For example, the time period may be every one or more seconds, every one or more minutes, every one or more hours, and the like.

Using the double buffering technique described in more detail below, processing may be performed periodically by each processing core that alternates between use of counters [0] 420 and counters[1] 422, and alternates between use of the deltas[0] 430 and deltas[1] 432 with alternating time periods for reading and writing. The update toggle 442 may be a value of 0 or 1 and may denote the current set of deltas used in a particular time period for modifying or updating. When update toggle is 1, updates to global counter values are made by updating the deltas[1] 432. When update toggle is 0, updates to global counter values are made by updating the deltas[0] 430. Generally, modifying one of the global counters is performed locally by a processing core by updating one of the deltas[update toggle] corresponding to the particular global counter value. The read toggle 444 may be a value of 0 or 1 and may denote the current set of counters and deltas used in a particular time period for reading. When read toggle is 1, reading the global counter values is performed are made by reading the deltas[1] 432 and the counters[1] 422. When read toggle is 0, reading the global counter values is performed are made by the deltas[0] 430 and the counters[0] 420. Generally, reading one of the global counters is performed locally by a processing core by reading one of the deltas[read toggle] in combination with one of the counters[read toggle] corresponding to the particular global counter value.

The elements 420, 422, 430 and 432 in the FIG. 4 may be viewed as a two dimensional vector, matrix or array in which each row "I" includes a value from each of 420, 422, 430 and 432 for a single global counter having a corresponding global counter value in entry "I" of the counters 410 of the GM 312. From the logical representation of the two dimensional vector or array, J may denote the column corresponding to one of 420, 422, 430 or 432. In this example, I may be an integer in the range from 0 through 3, inclusively, and J may also be in an integer in the range 0 through 3, inclusively. More generally, for an embodiment in which there are "N" global counters, I may be an integer value in the range 0 through N−1, inclusively.

As noted elsewhere herein, when code is executed on a CPU of a processing core to read a global counter, the value for the global counter may be obtained by reading a combination of a local delta and a local counter from the private cache of the processing core. When code is executed on a CPU of the processing core to update a global counter, a local delta from the private cache of the processing core may be updated.

Figure 5:
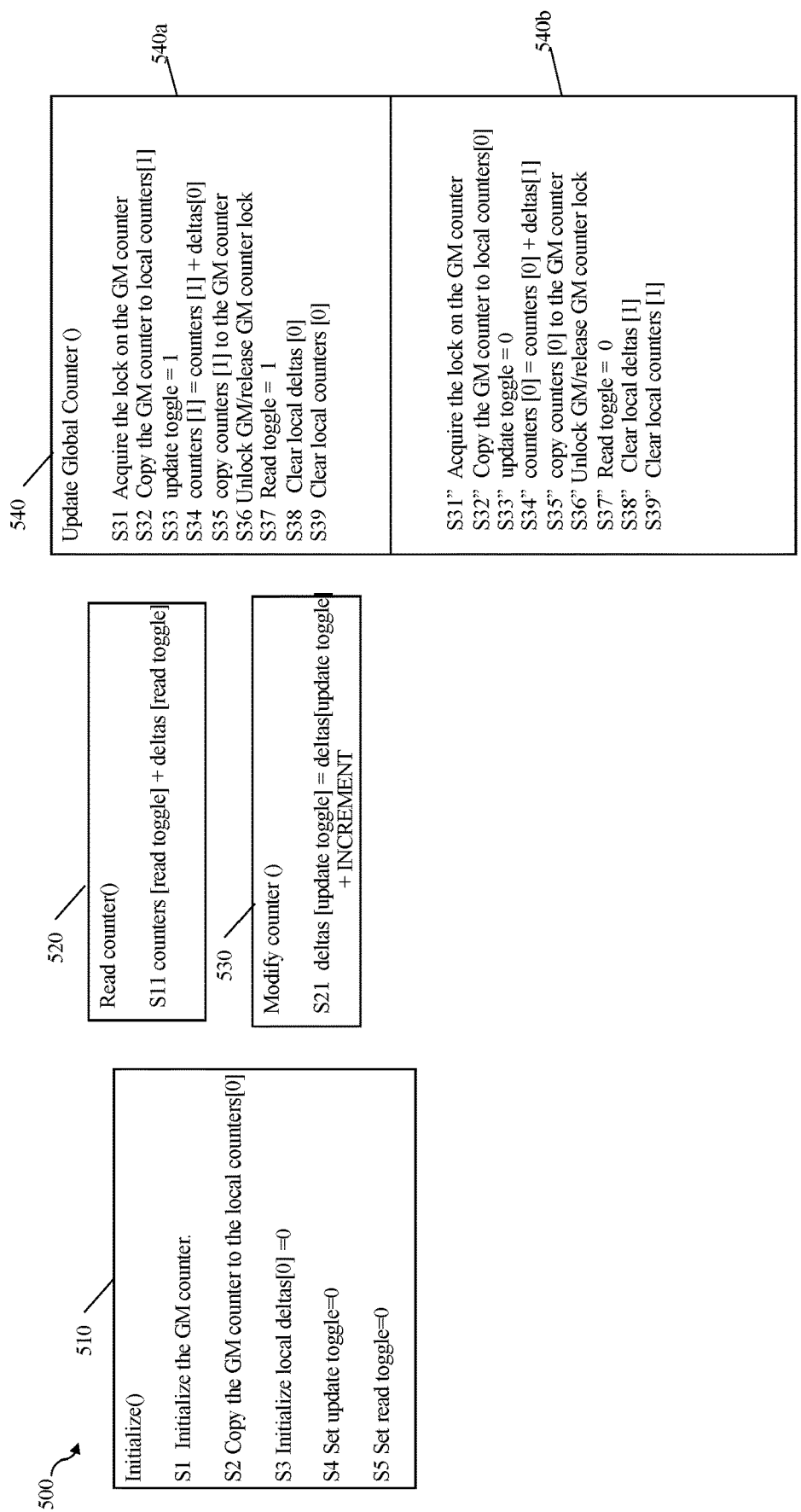
FIGS. 5 and 6 describe processing that may be performed in an embodiment in accordance with the techniques herein.

Referring to FIG. 5, shown is an example illustrating processing that may be performed in an embodiment in accordance with the techniques herein. The example 500 includes different processes that may be executed in connection with the techniques herein.

It should be noted that the different processes described and illustrated in the FIG. 5 are expressed with respect to only a single global counter value using a double buffering technique with a first buffer denoted by counters[0], a second buffer denoted by counters[1], a first buffer of local delta values denoted by deltas[0] and a second buffer of local delta values denoted by deltas[1]. Put another way, for simplicity of illustration, FIG. 5 describes processing that may be performed with respect to a single row of the array, matrix or vector described with respect to elements 420, 422 430 and 432 of the FIG. 4. More generally, the techniques and processing described with respect to the FIG. 5 may be performed with respect to multiple global counters such as illustrated in the FIG. 4.

The element 510 denotes steps performed in an initialize process. The element 520 denotes steps performed in a read counter process to read a current value of a global counter using locally cached values stored in the private cache of a processing core. The element 530 denotes steps performed in a modify counter process to update or modify a global counter by modifying a locally cached value stored in the private cache of a processing core. The element 540 denotes steps performed in an update global counter process to push local updates to a global counter as performed by a processing core to the GM.

The initialize process 510 may be executed once to initialize the various data items of FIG. 4 for use in connection with the techniques herein. The initialize process 510 may be executed, for example, when the system is initialized prior to performing steps of other processes such as illustrated in the FIG. 5. The initialize process 510 includes step S1 where the GM counter, such as one of the counters 410a of the GM 312, may be initialized to a starting value, such as 0. From the step S1, processing proceeds to the step S2 where the copy of the GM counter, such as 410a, is copied to a corresponding local counters[0], such 420a, in the private memory or cache 402 of all the processing cores. From the step S2, processing proceeds to the step S3 where the local deltas[0], such as 430a, of each processing core is initialized. From the step S3, control proceeds to the step S4 where the update toggle 442 of each processing core is initialized to 0. From the step S4, control proceeds to the step S5 where the read toggle 444 of each processing core is initialized to 0.

Generally, the initialize process 510 in the steps S2-S5 initializes locally cached values of all the processing cores where such locally cached values may be used in connection with a first time period or time interval using the first buffers or sets of values in the local counters [0] and deltas [0]. Subsequent to performing the initialize process 510, code may be executed on one or more of the processing cores to read and/or modify the global counter.

Instances of the read counter process 520, the modify counter process 530 and the update global counter process 540 may be included in each of the processing cores for use with the techniques herein where each such processing core performs processing using data items stored in its private memory or cache 402. Each processing core may execute the code of the processes 52, 540 and 540 as described herein.

Subsequent to completing initialization processing steps of 510, processing may be performed by a processing core to read a global counter by performing the steps of the read counter process 520. In the step S11, processing is performed to read a current counter value from the buffers or sets of values denoted by update toggle. At this point in time, read toggle is 0 so the step S11 may indicate to compute the current value for the global counter by adding counters[0] to deltas[0]. The more general representation of the step S11 is denoted in FIG. 5 as "counters [read toggle]+deltas [read toggle]", where the resulting sum of the step S11 may denote the current value for the global counter determined using the locally cached values stored in the private cache of the processing core. As the value for read toggle may change or toggle between 0 and 1, so does the particular set of values or buffers used in connection with the step S11 used for reading and computing the current value for the global counter.

The step of the modify counter process 530 may be performed by one of the processing cores to update or modify the global counter by updating a locally cached data value of the private cache of a processing core. Assume that INCREMENT denotes the incremental amount by which to modify or update the global counter. In the step S21, processing is performed to update the local deltas from the buffers or sets of values denoted by update toggle. At this point in time, update toggle=0 so the step S21 may indicate to update the global counter by updating deltas[0]. In this example, deltas[0] is incremented by the numeric value denoted by INCREMENT. The more general representation of the step S21 is denoted in FIG. 5 as "deltas [update toggle]=deltas[update toggle]+INCREMENT". As the value for update toggle may change or toggle between 0 and 1, so does the particular set of values or buffers used for performing the update of the global counter.

It should be noted that the step S21 involves performing a mathematical operation that, when implemented at the operation or instruction level, may include performing multiple instructions or operations including first reading a current value for deltas[update toggle], adding or incrementing the current value by an amount denoted by INCREMENT, and then storing the result of the foregoing addition back into deltas[update toggle]. An embodiment may perform the operations comprising the step S21 as an atomic operation for local update synchronization purposes. In at least one embodiment, the CPU instruction set may include an instruction that may be used to perform multiple operations of the step S21 atomically. In at least one embodiment, an atomic add or increment instruction may be used to perform S21 atomically as may be alternatively denoted by:

atomic_inc (&deltas[update toggle], INCREMENT)

where

&deltas[update toggle] denotes the address of the location to be incremented or updated;

INCREMENT denotes the amount by which to add or increase deltas[update toggle]; and atomic_inc denotes the atomic increment instruction that atomically performs the requested increment or update operation.

It should be noted that in this example, the global counter value may be incremented by a amount as denoted by INCREMENT that is added to the current value stored in deltas[update toggle]. More generally, any suitable technique may be used to atomically perform processing to update or modify deltas[update toggle].

Within the modify counter process 530, the atomic increment (atomic_inc) operation may be generally implemented using any suitable technique or mechanism available in an embodiment. For example, in at least one embodiment, the modify counter may be implemented using a spinlock, suitable computer instruction that may be available in an instruction set or computing architecture, and the like. More generally, the atomic increment operation may be performed using any suitable processor core level locking mechanism that prevents 2 executing processes on CPUs of the same processing core from accessing the data item being updated. Consistent with discussion elsewhere herein, in an embodiment in which each processing core is rather a single CPU rather, such synchronization to local resources used only by the single processing core are not needed.

Consistent with discussion elsewhere herein, each processing core may periodically perform the steps of the update global counter process 540 to update or push its updated locally cached value for the global counter to the GM. Such updating may be performed at any time interval or time period suitable for a particular application using the techniques herein. For example, the time period may be every one or more seconds, every one or more minutes, every one or more hours, and the like. In at least one embodiment, the last update time 440 may denote the last or most recent time that the process 540 is invoked. The process 540 may be subsequently invoked after an amount of time has elapsed equal to the time period. For example, assume that at a first time T1 the process 540 is invoked. Assume that the process 540 is scheduled to execute every time period denoted by P1. In this case, after the first invocation of process 540 at time T1, the last update time 440 is updated to T1. At a second point in time denoted by T1+P1, the process 540 is again invoked and the last update time 440 is updated to T1+P1. In a similar manner, as each subsequent amount of time that elapses equals P1, the process 540 is invoked and the last update time 440 is updated.

What will now be described are the steps of the update global counter process 540. The process 540 includes two portions or sections 540*a* and 540*b*. Generally, the update global counter process 540 alternates between performing the steps of 540*a* after one time period has elapsed, and then performing the steps of 540*b* after the next consecutive time period has elapsed. The foregoing may be continuously repeated. In this manner, upon consecutive sequential executions of the process 540 after each occurrence of a next time period P1, the following denotes a sequential pattern of processing steps performed: 540a, 540b, 540a, 540b, and so on, continuously alternating between performing the steps of 540a and 540b.

Consistent with discussion above, assume that the time period P1 has elapsed and that the update global counter process 540 has not yet been executed. At this point in processing, the steps of 540a are executed. Additionally, update toggle=0 and read toggle=0 denoting that the first set of local counters[0] and deltas[0] are used for reading and modifying the global counter value by the processing core.

In the step S31, the processing core acquires the lock 412 on the GM counter such as 410a thereby providing the processing core exclusive access to the GM counter. From the step S31, control proceeds to the step S32. At the step S32, processing is performed to copy the GM counter 410a to the processing core's local counters[1], such as 422a.

From the step S32, control proceeds to the step S33 where update toggle is set 1. After the step S33, subsequent updates to the global counter are made locally by the processing core by having the modify counter process 530 update deltas[1] (e.g., 432a) rather than deltas[0] (e.g., 430a). From the step S33, control proceeds to the step S34 where deltas[0] (e.g., 430a) is added to counters[1] (e.g., 422a) and the result is stored in counters[1] (e.g., 422a). At this point in processing, deltas[0] is not written to by the modify counter process 530 and may be accessed for reading in the step S34. From the step S34, control proceeds to the step S35.

At the step S35, processing is performed to copy counters [1] (e.g., 422a) from the processing core's private cache or memory to the GM counter 410a thereby publishing the processing core's local copy of the counter to GM. From the step S35, control proceeds to the step S36 where the GM lock 412 (previously acquired in the step S31) is released. From the step S36, control proceeds to the step S37 where read toggle is set to 1.

At this point after executing the step S37, read toggle=1 and also update toggle=1. From the step S37, control proceeds to the step S38. In the step S38, deltas[0] (e.g., 430a) is cleared and thus reinitialized for the next time period that the local buffer deltas[0] is used to store the updated increment applied to the global counter value 410a.

After the step S38 is performed, the step S39 may be performed to clear counters[0] (e.g., 420a for the global counter 410a).

In at least one embodiment where each processing core includes multiple CPUs, the processing performed in the steps S33 and S37 may each be performed atomically in a synchronized manner to avoid any possible race conditions. For example, the read counter process 520 in the step S11 accesses both counters [read toggle] and deltas [read toggle]. Without such synchronization, the step S37 may, for example, update the read toggle while the step S11 is in the middle of executing. For example, assume that read toggle=0 so that the step S11 reads counters [0] where read toggle=0. Prior to S11 then reading deltas[0], the step S37 may update the read toggle to 1. Step S11 may then undesirably read deltas[1] rather than deltas[0].

Any suitable synchronization mechanism may be utilized in connection with performing the desired synchronization needed when the update global counter process 540 updates the toggle values in the steps S33 and S37. In at least one embodiment, the synchronization mechanism used may logically implement the following: If the toggle is currently accessed for read but not write, additional readers are allowed.

If the toggle is currently accessed for read but not write, do not allow write access until all readers have completed.

If the toggle is current accessed for write whereby a writer has exclusive access to the toggle, don't allow any other access (e.g., read or write access by another is not allowed while a writer has exclusive write access).

In at least one embodiment, a read-copy-update or RCU synchronization mechanism may be used that is based on mutual exclusion. The RCU may be used when performance of reads is crucial and is an example of space-time tradeoff, enabling fast operations at the cost of more space. RCU allows multiple threads to efficiently read from shared memory by deferring updates or write after pre-existing reads to a later time while simultaneously updating the data, ensuring new readers will read the updated data. This makes all readers proceed as if there were no synchronization involved, hence they will be fast, but also making updates more difficult. RCU does not implement mutual exclusion in the conventional sense since RCU readers may run concurrently with RCU updates. RCU's variant of mutual exclusion is in terms of space or storage, with RCU readers accessing old versions of data being concurrently updated, rather than in time, as is the case for conventional concurrency-control mechanisms.

In at least one embodiment, prior to reading a toggle value, such as the read toggle or update toggle, an RCU read lock may be invoked. Subsequent to a reader completing its read accesses, the read may call RCU read unlock. Thus, for example, RCU read lock may be invoked prior to an instruction or section of code that reads and uses read toggle and prior to an instruction or section of code the reads and uses update toggle. When the reader is done, the reader may invoke RCU read unlock to signal that the reader is no longer reading or using the particular toggle. Thus, RCU read lock signals that an additional reader is accessing a toggle value and RCU read unlock signals that the number of readers is decreasing by one. For example with respect to read toggle and an RCU lock for read toggle, RCU read lock may be invoked prior to performing S11 and RCU read unlock may be invoked after completing the step S11. With respect to update toggle and an RCU lock for updated toggle, RCU read lock may be invoked prior to performing S21 and RCU read unlock may be invoked after completing the step S21.

In at least one embodiment, a writer may call RCU synchronize to update a toggle, such as the read toggle or update toggle. The RCU synchronize may update a current value of the toggle where the current value is stored in a first memory location. The updated copy of the toggle may be stored in a second different memory location than the first memory location storing the current value of the toggle that may be in use by a reader. Once no more readers are accessing or using the current value of the toggle as stored in the first memory location, the first memory location may be overwritten or updated to include the updated toggle value as stored in the second memory location. During this updating of the first memory location, no readers are allowed to access the toggle value of the first memory location (e.g., readers of the toggle are blocked until the write or update of the toggle has completed). In this manner, exclusive access to the toggle of the first memory location is provided for use during the updating of the first memory location to the new updated toggle value when no reader is also accessing the first memory location. Once the updated toggle value is stored in the first memory location, readers may once again be allowed read access using the new updated toggle value. For example, RCU synchronize with respect to update toggle may be invoked prior to S33 to ensure that the update to update toggle is performed when no readers are accessing update toggle. RCU synchronize with respect to read toggle may be invoked prior to S37 to ensure that the update to read toggle is performed when no readers are accessing read toggle.

Depending on the particular synchronization mechanism used and how it is implemented, some embodiments may also choose not to block new or subsequent readers where such subsequent readers issue the RCU read lock after the RCU synchronize call is made by the writer. In such an embodiment, further preference is given to readers that keep using the current value rather than the updated toggle value. Alternatively, an embodiment may choose to block new or subsequent readers and perform the update to the toggle value where such subsequent readers issue the RCU read lock after the RCU synchronize call is made by the writer. In such an embodiment as in the latter alternative case, the updating of the first memory location to include the updated toggle value is performed and the subsequent readers use the new updated toggle value.

As a variation, an embodiment may use a read-write (RW) lock where concurrent access is allowed for read only operations while write operations require exclusive access. Thus, multiple threads or processes can read the data in parallel but an exclusive lock is needed for writing or modifying data. When a writer is writing the data, all other writers or readers are blocked until the writer is finished writing.

Thus generally a synchronization mechanism may be used to ensure that the steps S33 and S37 of the update global counter process 540 are performed atomically.

At this point in connection with the example of the FIG. 5, assume that the first execution of the update global counter process 540 has completed execution of the steps of 540a. Subsequently, an amount of time equal to the time period P1 again elapses and the update global counter process 540 may once again be invoked. However, in connection with this next execution, processing steps alternate and use different or opposite buffers from that as described in connection with the FIG. 5. In this second invocation of the update global counter process 540, the steps of 540b are executed. Additionally at this point in time, update toggle=1 and read toggle=1 denoting that the first set of local counters[1] and deltas[1] are currently used for reading and modifying the global counter value by the processing core. Note that update toggle=1 and read toggle=1 when commencing execution of 540b since the foregoing were values assigned to the toggles during the last execution of 540a.

The step S31" of 540b is the same as the step S31 described above in connection with 540a. From the step S31", control proceeds to the step S32". At the step S32, processing is performed to copy the GM counter 410a to the processing core's local counters[0], such as 420a.

From the step S32", control proceeds to the step S33" where update toggle is set 0. After the step S33", subsequent updates to the global counter are made locally by the processing core by having the modify counter process 530 update deltas[0] (e.g., 430a) rather than deltas[1] (e.g., 432a). From the step S33", control proceeds to the step S34" where deltas[1] (e.g., 432a) is added to counters[0] (e.g., 420a) and the result is stored in counters[0] (e.g., 420a). From the step S34", control proceeds to the step S35".

At the step S35", processing is performed to copy counters[0] (e.g., 420a) from the processing core's private cache or memory to the GM counter 410a thereby publishing the processing core's local copy of the counter to GM. From the step S35", control proceeds to the step S36" where the GM lock 412 (previously acquired in the step S31) is released.

Step S36" is the same as the step S36 as described above. From the step S36", control proceeds to the step S37" where read toggle is set to 0.

At this point after executing the step S37", read toggle=0 and also update toggle=0. From the step S37", control proceeds to the step S38". In the step S38", deltas[1] (e.g., 432a) is cleared and thus reinitialized for the next time period that the local buffer deltas[1] is used to store the updated increment applied to the global counter value 410a.

After the step S38" is performed, the step S39" may be performed to clear counters[1] (e.g., 422a for the global counter 410a).

In at least one embodiment where each processing core includes multiple CPUs, the processing performed in the steps S33" and S37" may each be performed atomically in a synchronized manner to avoid any possible race conditions.

Any suitable synchronization mechanism may be utilized in connection with performing the desired synchronization needed when the update global counter process 540 updates the toggle values in the step S33" and S37". In at least one embodiment, the synchronization mechanism used in the steps S33" and S37" may logically implement the following as described above in connection with S33 and S37:

If the toggle is currently accessed for read but not write, additional readers are allowed.

If the toggle is currently accessed for read but not write, do not allow write access until all readers have completed.

If the toggle is currently accessed for write whereby a writer has exclusive access to the toggle, don't allow any other access (e.g., read or write access by another is not allowed while a writer has exclusive write access).

In at least one embodiment, the RCU synchronization mechanism or a RW lock may be used in connection with S33" in a manner similar to that as discussed above with respect to S33, and the RCU synchronization mechanism or a RW lock may be used in connection with S37" in a manner similar to that as discussed above with respect to S37.

Thus generally any synchronization mechanism may be used to ensure that the steps S33" and S37" of the update global counter process 540 are performed atomically.

In connection with the processing steps of 540a and 540b, it should be noted that the steps S39 of 540a and S39" of 540b may be optional steps. For example, assume that 540a is executed and the step S39 clears counters[0]. After the next time period elapses and the update global counter process 540 is again executed, the steps of 540b are executed and the counters[0] will be reset in the step S32". In a similar manner, assume that 540b is executed and the step S39" clears counters[1]. After the next time period elapses and the update global counter process 540 is again executed, the steps of 540a are executed and the counters[1] will be reset in the step S32.

The update global counter process 540 of FIG. 5 may be logically encoded using a suitable programming language to use the different or alternate buffers and alternate between performing 540a and 540b upon successive consecutive invocations of the process 540.

Figure 6:
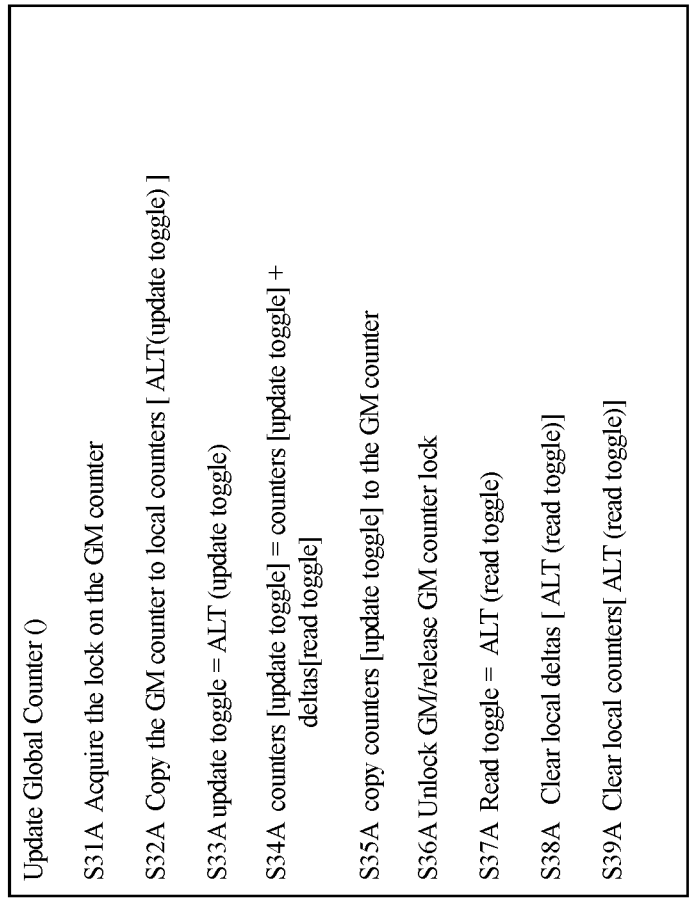

Referring to the FIG. 6, shown is an example 600 illustrating how processing steps of the update global counter process may be encoded in an embodiment in accordance with the techniques herein. The example 600 is logically equivalent to continuously alternating between performing the steps of 540a and 540b for sequential invocations of the process 540 as described in connection with the FIG. 5.

In connection with the representation of the update global counter process of the FIG. 6, ALT may denote a routine or function that returns the alternate buffer identifier (ID) or index of its argument. More formally:

ALT (X)

Where

"X" denotes an integer valued argument of a first buffer ID or index; and

ALT(X) returns the alternate buffer ID or index of the argument X.

In connection with the examples described herein, the toggle values or variables, read toggle and update toggle, may be characterized as having a value denoting a buffer ID or index that is set to alternating values of the 2 possible buffer IDs or index values of "0" and "1". With reference back to FIG. 4, a first set of buffers having an associated buffer ID or index=0 may include counters[0] 420 and deltas[0] 430; and a second set of buffers having an associated buffer ID or index=1 may include counters[1] 422 and deltas[1] 432. The steps of update global counter set update toggle and read toggle to alternating buffer ID or index values 0 and 1 in connection with subsequent sequential invocations. Thus, in connection with ALT (X) as used in FIG. 6 processing steps, for a given buffer ID or index "X", ALT(X) returns the other alternate buffer ID or index. For example, ALT(0)=1 and ALT (1)=0. The argument "X" may also be an expression evaluated to obtain a current value used for the argument. For example, "X" may be one of the toggle values, such as read toggle or update toggle, that is evaluated to obtain the current value of the argument. For example, assume read toggle=1, then ALT(read toggle)=0. If update toggle=0, then ALT(update toggle)=1.

At the step S31A, the lock 412 on the GM counter, such as 410a, may be obtained. The step S31A corresponds to the steps S31 and S31" described above. From the step S31A, control proceeds to the step S32A. At the step S32A, processing is performed to copy the GM counter 410a to one of the processing core's local counters, denoted as local counters [ALT(update toggle)]. ALT may denote a routine or function that returns the alternate buffer identifier (ID) as described elsewhere herein. The step S32A corresponds to the steps S32 and S32" described above and logically denotes the processing of such steps that varies with the value of update toggle.

From the step S32A, control proceeds to the step S33A where update toggle is set ALT(update toggle), where ALT denotes a routine or function that returns the alternate buffer identifier (ID) as described elsewhere herein. The step S33A corresponds to the steps S33 and S33" described above and logically denotes the processing of such steps that varies with the value of update toggle.

After the step S33A, control proceeds to the step S34A where counters [update toggle]=counters [update toggle]+deltas[read toggle]. The step S34A corresponds to the steps S34 and S34" described above and logically denotes the processing of such steps that varies with the values of update toggle and read toggle. From the step S34A, control proceeds to the step S35A.

At the step S35A, processing is performed to copy counters[update toggle] from the processing core's private cache or memory to the GM thereby publishing the processing core's local copy of the counter to GM. The step S35A corresponds to the steps S35 and S35" described above and logically denotes the processing of such steps that varies with the value of update toggle. From the step S35A, control proceeds to the step S36A.

At the step S36A, the GM lock (previously acquired in the step S31A) is released.

Step S36A is the same as the steps S36 and S36" as described above. From the step S36A, control proceeds to the step S37A where read toggle is set ALT(read toggle), where ALT denotes a routine or function that returns the alternate buffer identifier (ID) as described elsewhere herein. The step S37A corresponds to the steps S37 and S37" described above and logically denotes the processing of such steps that varies with the value of read toggle.

From the step S37A, control proceeds to the step S38A. In the step S38A, deltas[ALT (read toggle)] is cleared and thus reinitialized for the next time period. In S38A, ALT denotes a routine or function that returns the alternate buffer identifier (ID) as described elsewhere herein. The step S38A corresponds to the steps S38 and S38" described above and logically denotes the processing of such steps that varies with the value of read toggle.

After the step S38A is performed, the step S39A may be performed to clear counters[ALT (read toggle)]. In the step S39A, ALT may denote a routine or function that returns the alternate buffer identifier (ID) as described elsewhere herein. The step S39A corresponds to the steps S39 and S39" described above and logically denotes the processing of such steps that varies with the value of read toggle.

Consistent with discussion above, in at least one embodiment where each processing core includes multiple CPUs, the processing performed in the steps S33A and S37A may each be performed atomically in a synchronized manner to avoid any possible race conditions.

In at least one embodiment, the RCU synchronization mechanism or a RW lock may be used in connection with S33A in a manner similar to that as discussed above with respect to S33 and S33. Additionally, the RCU synchronization mechanism or a RW lock may be used in connection with S37A in a manner similar to that as discussed above with respect to S37 and S37". More generally, any synchronization mechanism may be used to ensure that the steps S33A and S37A of the update global counter process of the FIG. 6 are performed atomically.

In connection with the example of FIG. 6, it should be noted that the step S39A may be an optional steps in a manner similar to that as noted above regarding S39 and S39".

An embodiment may use the techniques as described herein in connection with implementing any suitable global counters or, more generally, global variables or global values. For example in at least one embodiment, global counters may be used as described herein to implement an amount of the cache used to store WP data for each LUN. For example, if there are 1000 LUNs in the system, there may be 1000 global counters implemented using the techniques as described herein. In such an embodiment, each director corresponding to one of the processing cores may read and/or update the global counter tracking the amount of cache used to store WP data for each of the 1000 LUNs. For example, an FA may receive a write I/O to a LUN and store the write I/O's write data into cache. In response the FA may also update the counter of WP data for the LUN. Such global counters tracking the amount of cache used to store WP data per LUN may be used to maintain some level of fairness in the use of cache for storing WP data for the different LUNs in the system. For example, an embodiment may not allow a LUN to exceed a specified amount of cache usage for storing WP data. Responsive to a LUN reaching its WP threshold, a suitable action or response may be taken such as, for example, destaging WP data for the LUN from cache that is written out to the backend non-volatile storage PDs.

An embodiment may also have a global counter denoting the total or cumulative amount of cache allocated for storing WP data aggregated with respect to all LUNs in the system.

In at least one embodiment, global counters in connection with the techniques herein may be used to store system wide parameters or thresholds that may be configurable, dynamic or modifiable. An embodiment may change one of the parameters dynamically and implementing the parameter as a global counter or value as described herein may allow any updates to the parameter to be shared across the processing cores and thus directors.

In at least one embodiment, the global counters in connection with the techniques herein may be used to store collected systemwide statistics that may be configurable, dynamic or modifiable by the processing cores.

In the embodiment as described in connection with the FIGS. 4, 5 and 6, two sets of buffers are used in connection with the counters and deltas. More generally, N sets of buffers may be used in connection with the counters and deltas, where N is an integer having a value of 2 or more. In such an embodiment, the read toggle and the update toggle may each more generally be a selector that is an integer value. The selector may be updated, such as in the update global counter process, to denote the next set of locally stored counters and deltas to be used.

Figure 7:
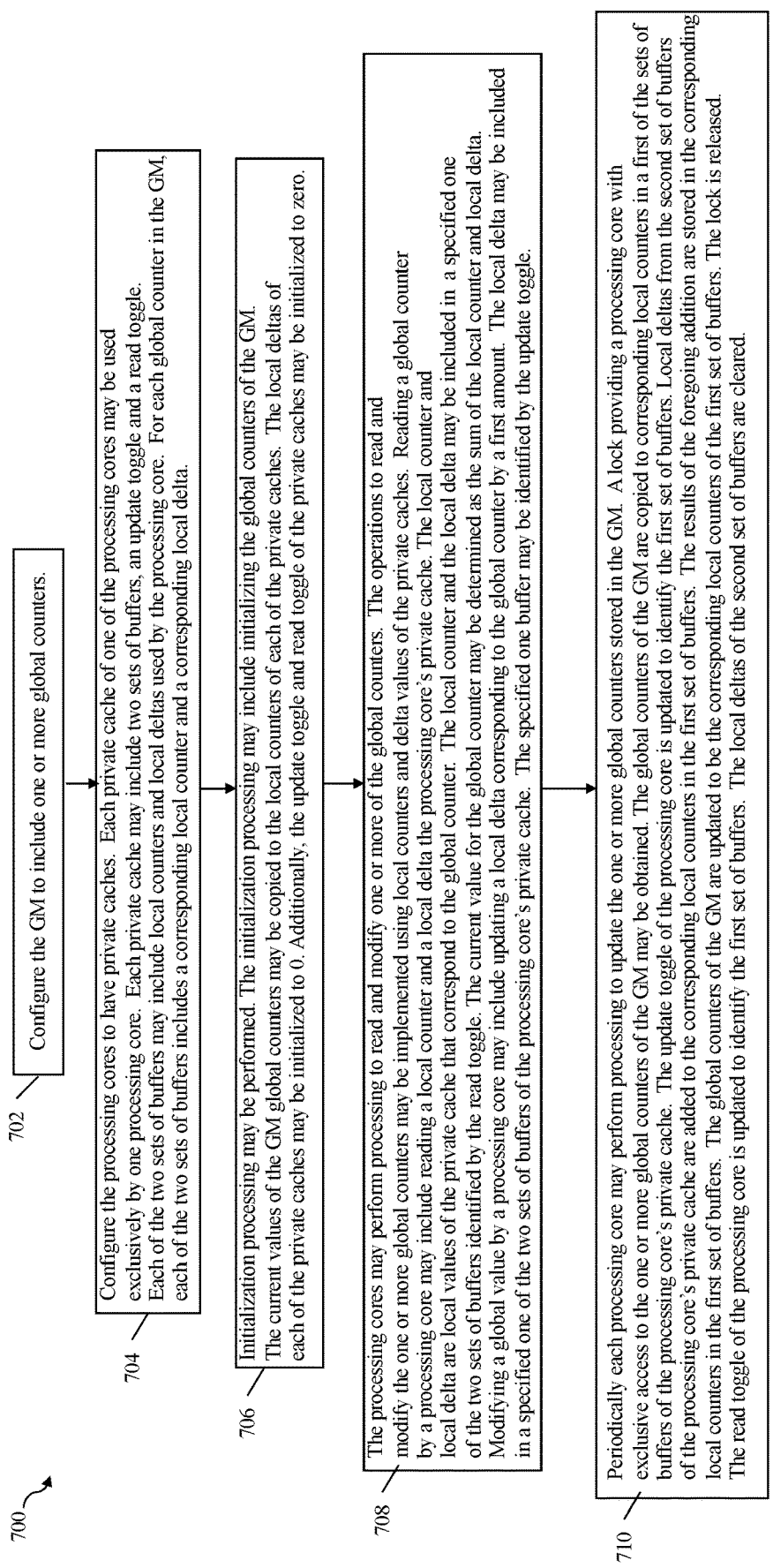
FIG. 7 is a flowchart of processing steps that may be performed in an embodiment in accordance with the techniques herein.

Referring to FIG. 7, shown is a flowchart 700 of processing steps that may be performed in an embodiment in accordance with the techniques herein. The flowchart 700 summarizes processing discussed above.

At the step 702, the GM may be configured to include one or more global counters. From the step 702, control proceeds to the step 704. At the step 704, the processing cores are configured to have private caches. Each private cache of one of the processing cores may be used exclusively by one processing core. Each private cache may include two sets of buffers, an update toggle and a read toggle. Each of the two sets of buffers may include local counters and local deltas used by the processing core. For each global counter in the GM, each of the two sets of buffers includes a corresponding local counter and a corresponding local delta. From the step 704, control proceeds to the step 706.

At the step 706, initialization processing is performed. The initialization processing may include initializing the global counters of the GM. The current values of the GM global counters may be copied to the local counters of each of the private caches. The local deltas of each of the private caches may be initialized to 0. Additionally, the update toggle and read toggle of the private caches may be initialized to zero. From the step 706, control proceeds to the step 708.

At the step 708, the processing cores may perform processing to read and modify one or more of the global counters. The operations to read and modify the one or more global counters may be implemented using local counters and delta values of the private caches.

In the step 708, reading a global counter by a processing core may include reading a local counter and a local delta the processing core's private cache. The local counter and local delta are local values of the private cache that correspond to the global counter. The local counter and the local delta may be included in a specified one of the two sets of buffers identified by the read toggle. The current value for the global counter may be determined as the sum of the local counter and local delta.

Also in the step 708, modifying a global value by a processing core may include updating a local delta corresponding to the global counter by a first amount. The local delta may be included in a specified one of the two sets of buffers of the processing core's private cache. The specified one buffer may be identified by the update toggle. From the step 708, control proceeds to the step 710.

At the step 710, periodically each processing core may perform processing to update the one or more global counters stored in the GM. In the step 710, a lock providing a processing core with exclusive access to the one or more global counters of the GM may be obtained. Once the lock is obtained, the global counters of the GM are copied to corresponding local counters in a first of the sets of buffers of the processing core's private cache. After the global counters of the GM are copied, the update toggle of the processing core is updated to identify the first set of buffers. After the update toggle is updated, local deltas from the second set of buffers of the processing core's private cache are added to the corresponding local counters in the first set of buffers. The results of the foregoing addition are then stored in the corresponding local counters in the first set of buffers. The global counters of the GM are updated to be the corresponding local counters of the first set of buffers. After the global counters of the GM are updated, the lock is released and the read toggle of the processing core is updated to identify the first set of buffers. Additionally, the local deltas of the second set of buffers are cleared.

It should be appreciated that while the steps are described herein as being performed serially and in a certain order, one or more these steps or portions thereof, may be performed concurrently and/or in a different order than illustrated and as described herein.

The techniques herein may be performed using any suitable hardware, firmware, software and/or other computer-implemented modules or devices having the described features and performing the described functions. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may be non-transitory and may include different forms of volatile (e.g., RAM) and non-volatile (e.g., ROM, flash memory, magnetic or optical disks, or tape) storage which may be removable or non-removable. Embodiments of the techniques described herein may be used in connection with any appropriate operating system.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of providing global values comprising:
configuring a global memory to include a global counter;
configuring a plurality of processing cores to have a plurality of private caches, wherein each private cache of the plurality of private caches is used exclusively by a different one of the plurality of processing cores, where said each private cache includes two sets of buffers, an update toggle and a read toggle, wherein each of the two sets of buffers in each of the plurality of private caches includes a local counter and a local delta value corresponding to the global counter;

performing first processing by a first of the plurality of processing cores to read a current value for the global counter, wherein a first private cache of the plurality of private caches is used exclusively by the first processing core, wherein the first processing comprises:
determining the current value of the global counter as a mathematical sum of the local counter value and the local delta value from one of the two sets of buffers of the first private cache identified by the read toggle of the first private cache; and
performing second processing by the first processing core to modify the global counter by a first amount, wherein the second processing comprises:
updating the local delta value from a specified one of the two set of buffers of the first private cache identified by the read toggle, wherein said updating includes adding the first amount to the local delta value from the specified one of the two set of buffers of the first private cache identified by the update toggle of the first private cache.

2. The method of claim 1, wherein initialization processing is performed prior to performing the first processing and prior to performing the second processing.

3. The method of claim 2, wherein the initialization processing includes:
copying a current value of the global counter from the global memory to the local counter of a first set of the two sets of buffers in each of the plurality of private caches;
initializing the update toggle of each of the plurality of private caches to identify the first set of buffers of said each private cache; and
initializing the read toggle of each of the plurality of private caches to identify the first set of buffers of said each private cache.

4. The method of claim 1, wherein the global memory is configured to include one or more global counters including the global counter, wherein each of two sets of buffers in each of the plurality of private caches includes one or more local counters corresponding to the one or more global counters and also includes one or more local delta values corresponding to the one or more global counters, and wherein the method further comprises periodically performing third processing by the first processing core to update the one or more global counters of the global memory.

5. The method of claim 4, wherein the third processing includes:
acquiring an exclusive lock on the one or more global counters of the global memory;
copying the one or more global counters of the global memory to the one or more local counters of a first of the two sets of buffers of the first private cache of the first processing core;
modifying the update toggle of the first private cache to identify the first set of buffers of the first private cache of the first processing core;
adding the one or more local delta values from the second set of buffers of the first private cache to the one or more local counters of the first set of buffers of the first private cache;
updating the one or more global counters of the global memory to have one or more revised values equal to the one or more local counters of the first set of buffers of the first private cache;
releasing the exclusive lock on the global counter of the global memory;

modifying the read toggle to identify the first set of buffers of the first private cache of the first processing core; and
clearing the one or more local delta values of the second set of buffers of the first private cache.

6. The method of claim 1, wherein the global memory is a distributed global memory including a plurality of memory global memory segments from a plurality of computing modules.

7. The method of claim 6, wherein each of the plurality of computing modules includes a different portion of the plurality of processing cores and a corresponding portion of the plurality of private caches used by the plurality of processing cores.

8. The method of claim 7, wherein each of the plurality of private caches, that is included in a first of the plurality of computing modules, is configured from a segment of memory used exclusively by a first portion of the plurality of processing cores of said first computing module.

9. The method of claim 1, wherein each of the plurality of processing cores includes a plurality of central processing units (CPUs).

10. A system comprising:
a plurality of processing cores; and
one or more memories comprising code stored thereon that, when executed, performs method of providing global values comprising:
configuring a global memory to include a global counter;
configuring the plurality of processing cores to have a plurality of private caches, wherein each private cache of the plurality of private caches is used exclusively by a different one of the plurality of processing cores, where said each private cache includes two sets of buffers, an update toggle and a read toggle, wherein each of the two sets of buffers in each of the plurality of private caches includes a local counter and a local delta value corresponding to the global counter;
performing first processing by a first of the plurality of processing cores to read a current value for the global counter, wherein a first private cache of the plurality of private caches is used exclusively by the first processing core, wherein the first processing comprises:
determining the current value of the global counter as a mathematical sum of the local counter value and the local delta value from one of the two sets of buffers of the first private cache identified by the read toggle of the first private cache; and
performing second processing by the first processing core to modify the global counter by a first amount, wherein the second processing comprises:
updating the local delta value from a specified one of the two set of buffers of the first private cache identified by the read toggle, wherein said updating includes adding the first amount to the local delta value from the specified one of the two set of buffers of the first private cache identified by the update toggle of the first private cache.

11. A non-transitory computer readable medium comprising code stored therein that, when executed, performs a method of providing global values comprising:
configuring a global memory to include a global counter;
configuring a plurality of processing cores to have a plurality of private caches, wherein each private cache of the plurality of private caches is used exclusively by a different one of the plurality of processing cores, where said each private cache includes two sets of
buffers, an update toggle and a read toggle, wherein
each of the two sets of buffers in each of the plurality
of private caches includes a local counter and a local
delta value corresponding to the global counter;
performing first processing by a first of the plurality of
processing cores to read a current value for the global
counter, wherein a first private cache of the plurality of
private caches is used exclusively by the first process-
ing core, wherein the first processing comprises:
determining the current value of the global counter as a
mathematical sum of the local counter value and the
local delta value from one of the two sets of buffers of
the first private cache identified by the read toggle of
the first private cache; and
performing second processing by the first processing core
to modify the global counter by a first amount, wherein
the second processing comprises:
updating the local delta value from a specified one of the
two set of buffers of the first private cache identified by
the read toggle, wherein said updating includes adding
the first amount to the local delta value from the
specified one of the two set of buffers of the first private
cache identified by the update toggle of the first private
cache.

12. The non-transitory computer readable medium of claim 11, wherein initialization processing is performed prior to performing the first processing and prior to performing the second processing.

13. The non-transitory computer readable medium of claim 12, wherein the initialization processing includes: copying a current value of the global counter from the global memory to the local counter of a first set of the two sets of buffers in each of the plurality of private caches;
initializing the update toggle of each of the plurality of private caches to identify the first set of buffers of said each private cache; and
initializing the read toggle of each of the plurality of private caches to identify the first set of buffers of said each private cache.

14. The non-transitory computer readable medium of claim 11, wherein the global memory is configured to include one or more global counters including the global counter, wherein each of two sets of buffers in each of the plurality of private caches includes one or more local counters corresponding to the one or more global counters and also includes one or more local delta values corresponding to the one or more global counters, and wherein the method further comprises periodically performing third processing by the first processing core to update the one or more global counters of the global memory.

15. The non-transitory computer readable medium of claim 14, wherein the third processing includes: acquiring an exclusive lock on the one or more global counters of the global memory;
copying the one or more global counters of the global memory to the one or more local counters of a first of the two sets of buffers of the first private cache of the first processing core;
modifying the update toggle of the first private cache to identify the first set of buffers of the first private cache of the first processing core;
adding the one or more local delta values from the second set of buffers of the first private cache to the one or more local counters of the first set of buffers of the first private cache;
updating the one or more global counters of the global memory to have one or more revised values equal to the one or more local counters of the first set of buffers of the first private cache;
releasing the exclusive lock on the global counter of the global memory;
modifying the read toggle to identify the first set of buffers of the first private cache of the first processing core; and
clearing the one or more local delta values of the second set of buffers of the first private cache.

16. The non-transitory computer readable medium of claim 11, wherein the global memory is a distributed global memory including a plurality of memory global memory segments from a plurality of computing modules.

17. The non-transitory computer readable medium of claim 16, wherein each of the plurality of computing modules includes a different portion of the plurality of processing cores and a corresponding portion of the plurality of private caches used by the plurality of processing cores.

18. The non-transitory computer readable medium of claim 17, wherein each of the plurality of private caches, that is included in a first of the plurality of computing modules, is configured from a segment of memory used exclusively by a first portion of the plurality of processing cores of said first computing module.

19. The non-transitory computer readable medium of claim 11, wherein each of the plurality of processing cores includes a plurality of central processing units (CPUs).

* * * * *